Jan. 12, 1932.  C. L. EKSERGIAN ET AL  1,840,941
METHOD OF MAKING WHEEL HUBS
Filed May 27, 1929
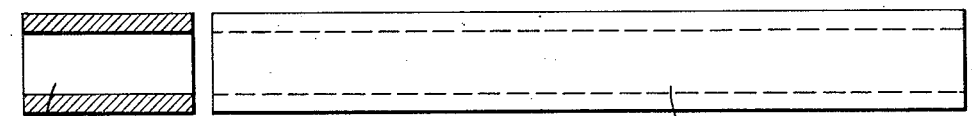
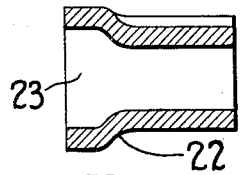 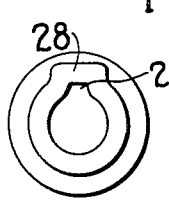 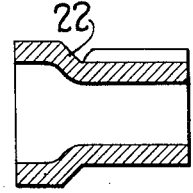 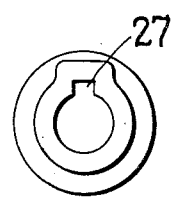
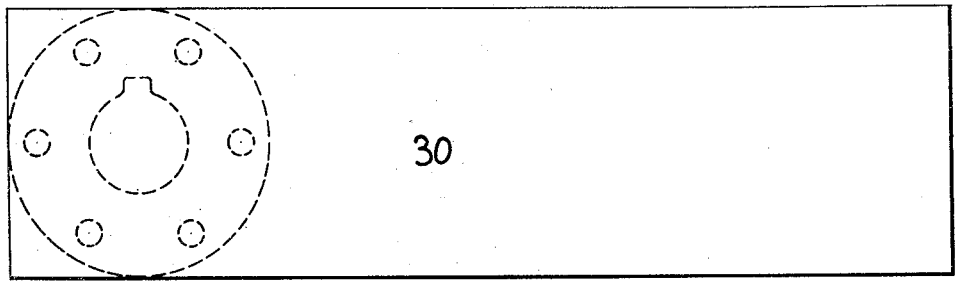
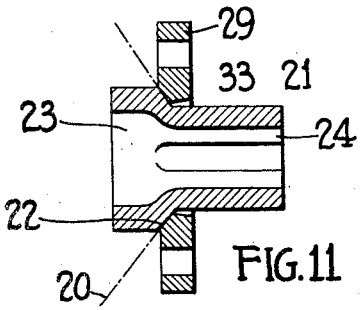 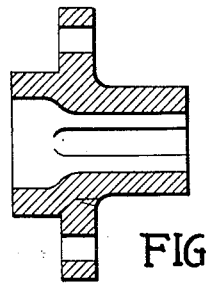
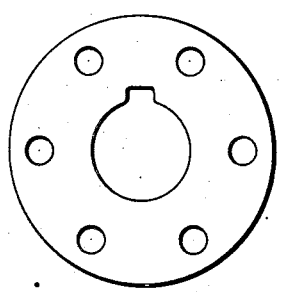  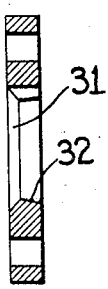
INVENTOR.
CAROLUS. L. EKSERGIAN
BY JOHN P. TARBOX.
ATTORNEY.

Patented Jan. 12, 1932

1,840,941

UNITED STATES PATENT OFFICE

CAROLUS L. EKSERGIAN, OF DETROIT, MICHIGAN, AND JOHN P. TARBOX, OF PHILADELPHIA, PENNSYLVANIA, ASSIGNORS TO BUDD WHEEL COMPANY, OF PHILADELPHIA, PENNSYLVANIA, A CORPORATION OF PENNSYLVANIA

METHOD OF MAKING WHEEL HUBS

Application filed May 27, 1929. Serial No. 366,269.

The method of our invention has to do particularly with hubs for automotive vehicles, but quite obviously, it has other adaptations. Its outstanding aim is the cheap production of such hubs with a minimum number of parts, with a reduced cost of fabrication of those parts, with a minimum number of operations of assembly of those parts, and with the smallest cost of such operations.

These ends and others we attain by making the entire barrel of the hub in one part and the entire flange in another part. Preferably, we divide the hub for the purpose of fabrication into these two parts along a conical surface at the root of the flange, in such manner that the entire flange is comprehended in one part and the entire barrel in the other. The barrel so divided we fabricate from pre-formed tubular stock by cutting therefrom in the first instance, a length of tubing substantially equal to the length of barrel desired, and by peripherally shouldering the length of the tubing so cut. The flange so divided we may form of plate stock or strip stock into the shape of a ring, and fit this ring to the exterior of the barrel and against the pre-formed shoulder. Thereupon we butt weld the ring to the shoulder in the margins of the opening in the ring. There are other and more detailed steps in the invention which will be apparent from the accompanying drawings.

Of these drawings,

Fig. 1 depicts a length of pre-forming tubing,

Fig. 2, an axial cross section of a severed length thereof,

Figs. 3 and 4, axial cross section and end elevation, respectively, of a section of tubing provided with a peripheral shoulder, Figs. 5 and 6 are axial cross section and end elevation showing the shoulder and other parts machined, Fig. 7 is a plan view showing in dotted lines the formation of a flanged ring from plate stock, Figs. 8 and 9 show in plan view and axial cross section the ring so formed, Fig. 10 shows this ring with a surface formed complemental to the shoulder, Fig. 11 shows the barrel and flange parts in axial cross section as assembled ready for welding, and Fig. 12 shows in axial cross section the completed product.

As clearly appears in Fig. 11 the hub is divided for the purpose of fabrication along the conical surface 20. This gives the barrel portion 21 of the hub per se a conically-shaped shoulder 22 intermediate its ends in the form shown. The inboard end 23 is of larger diameter than the outboard end 24, and the shoulder 20 is on that portion of the barrel intermediate the inboard and outboard portions. The coring out of the hub provides an interior surface of a contour similar to that of the exterior surface, the larger internal diameter being on the inboard end and the smaller at the outboard end.

This barrel, as aforesaid, we form from tubular stock. In Fig. 1, 25 is a length of pre-formed tubing, 26 is a section cut from this tubing of a length substantially equal to the length of the barrel desired, perhaps somewhat longer, if it is desired to offset the tubing or to allow for the expansion of its inboard end. This severed section of tubing 26 we forge by suitable dies, cold or hot, into the form shown in Figure 4 flaring one end to form the enlarged portion 23 of the hub barrel and the shoulder 22 in the rough. At the same time or at another time, we deform the opposite end of the barrel to form a keyway 27, the walls of which 28 protrude from the periphery of the barrel. Next, we machine the key-way 27 and also the shoulder 22 in order to make it a true surface about the axis of the barrel, and to relieve it of any scale, the result of the forging operation.

Referring again to Fig. 11, division on the conical surface 20 on the axis of the barrel gives the flange 29 the form of a ring. This ring, as shown in Fig. 7 is stamped from the plate stock 30, as indicated in dotted lines and as shown stamped in the views of Figs. 8 and 9. This ring we provide with a conical surface 31 complemental to the surface 22 of the hub by a subsequent machine operation as indicated in Fig. 10. By this same operation we cut off the edge of the ring opening as shown at 32, to enable the ring to fit freely over the outboard end of the barrel 21 and to provide sufficient clearance for the products of the butt welding operation, which is to join the parts together. The parts so fabricated, fitted and assembled together are shown in Fig. 11.

Thereupon, we butt weld the parts together by passing the electric current from the ring 29 to the barrel 21 through the complemental surface 22 of the shoulder on the barrel 31 on the opening of the ring. The parts are fastened together, the products of the welding operation filling the clearance space 33. The completed hub of Fig. 12 results after a cleaning of the exterior parts near the joint.

That our invention may be modified without departing from its generic spirit is attested by the fact that various processes may be used to fabricate the shouldered tubular barrel and that various processes may be used to fabricate the complemental flanged ring, thus, for example, the flanged ring may be formed of strip stock rolled edgewise into form, and in such case the economy of material is even greater than in the present disclosure. This, in view of the fact that the disclosure herein is generally diagrammatic, indicates that not only the claims but our disclosure at large should be given that breadth of interpretation which will insure to us all which falls within the purview of the spirit of our invention.

Flash welding may be substituted for butt welding if desired. In such case the clearance between the inner periphery of the ring and the outer periphery of the barrel of hub should be sufficient to avoid the formation of an arc therebetween and to confine the arc actually to the surfaces to be welded together. In the butt weld disclosed the extent of the bevel and therefore of the conical surfaces welded together may be greater or less and may in extreme cases extend entirely across the inner periphery of the ring 29. This, of course, involves different angles of bevel and different angles and heights of the shoulder 22.

All modifications of which our invention is susceptible are to be covered in the annexed claims.

What we claim is:

1. The method of forming a hub consisting of a main body portion and a flange portion, which comprises forming the main body portion into a tube having axially extending portions of different diameters and a shouldered portion inter-connecting said axially extending portions, and thereafter butt-welding the flange portion against said shouldered portion.

2. The method of forming a hub consisting of a main body portion and a flange portion which comprises forming the main body portion into a tube having axially extending portions of different diameters and a diagonally extending shouldered portion interconnecting said axially extending portions, forming an annular plate with a diagonally extending surface adjacent its inner circumference complemental to the diagonally extending shouldered portion of the main body and thereafter butt-welding the diagonally extending portion of the annular plate against the diagonally extending shouldered portion to constitute a flange extending radially from said main body portion.

In testimony whereof we hereunto affix our signatures.

CAROLUS L. EKSERGIAN.
JOHN P. TARBOX.